May 21, 1935.　　H. HUEBER ET AL　　2,002,318

VACUUM STABILIZER

Filed Sept. 26, 1929

Inventors
Henry Hueber
Erwin C. Horton
by
Barton A. Bean Jr.
Attorney

Patented May 21, 1935

2,002,318

UNITED STATES PATENT OFFICE 2,002,318

VACUUM STABILIZER

Henry Hueber, Buffalo, and Erwin C. Horton, Hamburg, N. Y., assignors to Trico Products Corporation, Buffalo, N. Y.

Application September 26, 1929, Serial No. 395,443

10 Claims. (Cl. 60—60)

This invention relates to a vacuum stabilizer for the purpose of operating vehicle accessories or adjuncts.

For instance, the fluid pressure type of windshield cleaner, which has proven to be the most satisfactory and desirable type of cleaner, usually operates on a sub-atmospheric pressure such as is obtained from the intake manifold of a motor vehicle engine which constitutes a source of suction, though variable. When the engine is unduly laboring the degree of low pressure or suction is at times insufficient for the satisfactory operation of the accessory. At other times during the normal operation of a motor vehicle the degree of low pressure or suction reaches a point which is in excess to that required for the efficient operation of the windshield cleaner. Consequently the windshield cleaner is caused to operate over a wide range of speeds, and it has been difficult for the driver to regulate the speed so as to render it more or less uniform.

The present invention is designed to provide a mechanism by which the windshield cleaner may be supplied at all times with an efficient supply of operating pressure and includes a pump positively driven, as from a moving part of the engine, together with means for avoiding the overtaxing of the accessory line or system.

The invention further resides in the provision of means for restricting or throttling the low pressure influences, when excessive, and working in conjunction with the suction pump to mutually co-act therewith in providing a substantially constant and uniform supply of low pressure for the operation of the accessory.

Figure 1:
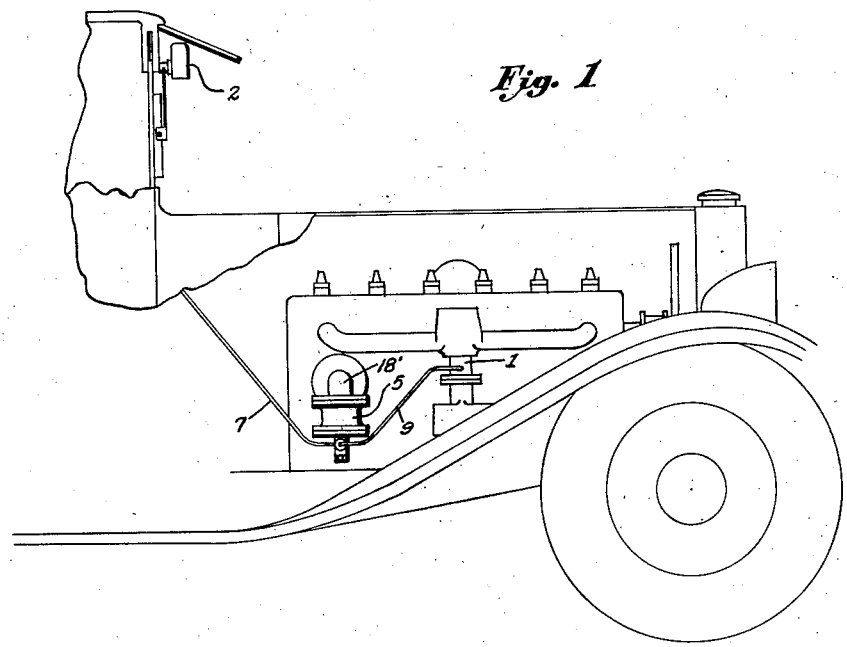
Fig. 1 is a fragmentary showing depicting our improved device incorporated in the fluid pressure line connecting the windshield cleaner to the intake manifold of a motor vehicle engine.
Figure 3:
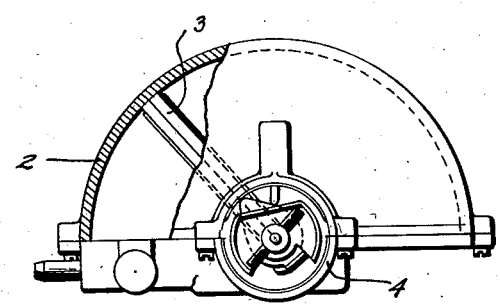
Fig. 3 is a broken elevation depicting a generally used type of windshield cleaner.

Referring more in detail to the accompanying drawing the numeral 1 designates the intake manifold and 2 the windshield cleaner the casing of which embodies a chamber having a piston 3 therein which is moved back and forth within the chamber by the production of a pressure differential on opposite sides of the piston, alternately reversed by a valve mechanism such as is indicated generally at 4.

Preferably in the suction line, which connects the cleaner to the intake manifold, there is inserted the auxiliary suction or low pressure producer comprising a chamber 5 having an inlet 6 connected by a conduit 7 to the cleaner 3, and an outlet 8 connected by a conduit 9 to the intake manifold. The two inlet and outlet ports are closed respectively by valves 10 and 11 operating to direct a flow of fluid from conduit 7 to the conduit 9 when the piston 12 is reciprocated. (The suction pump is not limited to the piston type, and obviously could be of the diaphragm type.) The piston 12 has its rod 13 slidably guided through the head 14 of the chamber 5 and carries on its outer end a collar 15 between which and the head 14 is compressed a spring 16 which tends to lift or move the piston 12 toward its upper limit of travel, the space in the chamber above the piston being open to the atmosphere, as through a port 17. It is clear that a downward movement of the piston will seat the valve 10 and unseat the valve 11 so as to expel any air or fluid in advance thereof through conduit 9, while upward movement of the piston will seat the valve 11 and unseat the valve 10 thereby withdrawing air through conduit 7 from the windshield cleaner at the low pressure side of the piston 3, as determined by the valve mechanism, atmospheric pressure being admitted at the high pressure side of the piston 3 so as to drive the piston toward the low pressure side until the passage connections are reversed by the valve mechanism.

Figure 2:
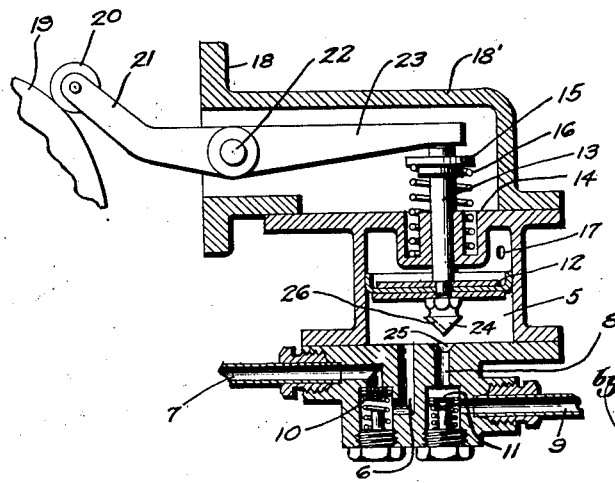
Fig. 2 is a vertical sectional view of the suction pump.

The suction pump may be provided with a mounting plate or flange 18 by which it is attached to the engine block or other supporting structure, and for the purposes of reciprocating the piston 12 the motor vehicle engine may constitute the source of power. A fragmentary portion of a cam 19, or other rotating part of the engine, is depicted in Fig. 2 as having operative engagement with a follower 20 which is carried on the power arm 21 of a lever having its fulcrum 22 arranged on the mounting plate 18. The work arm 23 of the lever projects into a hooded extension 18' of the mounting plate and has normal operating engagement with the upper end of the piston rod 13, the spring 16 maintaining this contact under normal conditions. Obviously the eccentricity or throw of the cam 19 will oscillate the lever 21, 23 to depress the piston 12 and then release it for its return by the spring 16, and therefore the lever with the spring 16 will co-act to reciprocate the piston permitting, however, the operative engagement between the lever and the piston rod to be broken when pressure conditions in the suction line or conduit 7, 9 are such as not to require the services of the auxiliary device, such as when the manifold suction reaches or exceeds an efficient operating normal.

The auxiliary device or suction pump will therefore come into action only when the manifold suction is deficient and as the manifold supply increases the piston 12 will gradually be drawn downwardly within the chamber 5 resulting in initially shortening the piston travel and finally disconnecting the piston altogether, as the manifold supply reaches its operating normal.

In order to avoid a "racing" of the windshield cleaner due to the manifold supply being in excess to the required normal, there is provided means for dissipating or throttling any excessive degree of suction. In its preferred embodiment this throttling control consists of a valve 24 having an imperfect engagement with its seat 25 formed in the outlet port 8, such imperfect seating being insured by providing a groove 26 in one of the seating faces. The throttling valve 24 is responsive to the suction influences in the manifold and may therefore be operated and controlled by the piston 12. To simplify its mounting the throttling valve is carried directly by the piston in such a manner as to gradually come into operation as the piston ceases to function as such. In other words, the throttling valve 24 will not move into a throttling position with respect to its seat 25 until after the piston has been totally disconnected from the operating part 19. The piston being of large expanse is quite sensitive and responsive to pressure changes or variations in the manifold so that the active force or influence of the excessive manifold suction will be considerably tempered and throttled in its influence on the accessory. The operating normal therefore will be confined between the limits of free movement of the piston 12, from the time it moves out of operative connection with the part 19 until the time that the throttling valve 24 begins to restrict the outlet port 8.

When the manifold suction recedes to again establish the operative connection between the port 19 and the piston 12 the manifold suction will be augmented or intensified to restore the low pressure as applied to the cleaner to that normal required for the efficient operation of the same, and when the manifold suction exceeds this normal the throttling action will aid in counteracting the effects of such excess upon the windshield cleaner.

What is claimed is:

1. A suction operated pump for automobile accessories comprising a power drive, a cylinder, a piston operable in the cylinder, means detachably connecting the drive to the piston and adapted for being rendered inoperative upon excessive manifold suction, said pump having an inlet opening and an outlet opening, and a throttle valve carried by the piston and operable upon the breaking of said connection for restricting one of the openings of said pump.

2. A suction pump for interposition in the suction line of motor vehicle accessories, comprising a casing, a piston operable therein to create negative pressure and itself being responsive to manifold suction, valve controlled ports of the pump operatively connected in the suction line, means for throttling one of the ports of said pump and operatively connected to the piston, and means normally urging the throttling means to an inoperative position.

3. A suction pump for supplementing the manifold supply of suction to motor vehicle accessories, comprising a casing, a piston operable therein to create negative pressure, valve controlled ports of the pump connected operatively in the suction line, means for throttling one of said ports and operatively connected to the piston, a drive for said piston for actuating the same in one direction of movement, said piston having a part removably engaging said drive, and resilient means urging said part into engagement with said drive, said piston being movable away from said drive under excess manifold suction in the suction line to effect actuation of said throttling means.

4. In combination with a suction-operated motor vehicle accessory and its suction line leading to a variable source of suction, a suction pump connected at its inlet side to the accessory and at its outlet side to the source of suction, a drive for the pump, means detachably connecting the pump to the drive, said means being responsive to pressure variations in the source of suction and rendered operative when the pressure is insufficient, and means operable by a part of the pump for dissipating the influence of an excessive supply of suction from said source on the accessory.

5. A suction pump for interposing in the suction lines of manifold-operated motor vehicle accessories, comprising a casing having inlet and outlet ports connected respectively to the accessory and manifold, a piston operable in the casing and free to move under manifold pressure of a predetermined degree, and a throttling valve of considerably smaller dimensions carried by the piston and acting to restrict the size of one of said ports when the piston is actuated by the manifold pressure.

6. A suction boosting pump for the accessory suction line of motor vehicles, comprising a suction pump having valved inlet and outlet ports and a piston, a drive for the piston, means yieldably holding the piston operatively related to said drive but permitting said piston to be drawn out of operative relation with the drive upon excessive manifold suction, and a valve carried by the piston for throttling one of said ports upon excessive manifold suction.

7. In combination with the intake manifold of an automobile, a suction operated accessory, and a suction line connecting the accessory to the manifold, a suction pump having a piston responsively movable by the manifold suction of a predetermined degree to an inoperative position, and a throttling valve operable by the piston under an excessive manifold suction for restricting the outlet of the suction pump.

8. In combination with a suction-operated accessory and the intake manifold of a motor vehicle engine connected thereto by a suction line, a cylinder, a piston operable in the cylinder, a drive for the piston, means detachably connecting the drive to the piston and adapted for being rendered inoperative by manifold suction above a predetermined degree, and a throttle valve carried by the piston and operable subsequent to the breaking of said connection for restricting the outlet of said pump when the manifold suction exceeds the predetermined degree aforesaid.

9. In combination with a power-operated accessory and a suction line connecting the accessory to the intake manifold of a motor vehicle engine, a casing, a drive, a piston operable in the casing by the drive to create negative pressure and itself being responsive to manifold suction for movement out of the effective range of said drive, valve controlled ports of the pump operatively connected in the suction line, means for throttling one of the ports of said pump and operatively connected to the piston, and means normally urging the throttling means to an inoperative position, the connection between the drive and piston being broken upon the throttling means becoming active.

10. In combination with a power-operated accessory and a suction line connecting the same to the intake manifold of a motor vehicle engine, a casing, a piston operable therein to create negative pressure, valve controlled ports of the pump connected operatively in the suction line, means for throttling one of said ports and operatively connected to the piston, a drive for said piston for actuating the same in one direction of movement, said piston having a part detachably engaging said drive, and resilient means urging said part into engagement with said drive, said piston being movable away from said drive under excess manifold suction in the suction line to break the drive connection and effect actuation of said throttling means.

HENRY HUEBER.
ERWIN C. HORTON.